Aug. 27, 1940. O. JACOBSEN Re. 21,541
PUMP RUNNER ASSEMBLY
Original Filed April 14, 1938
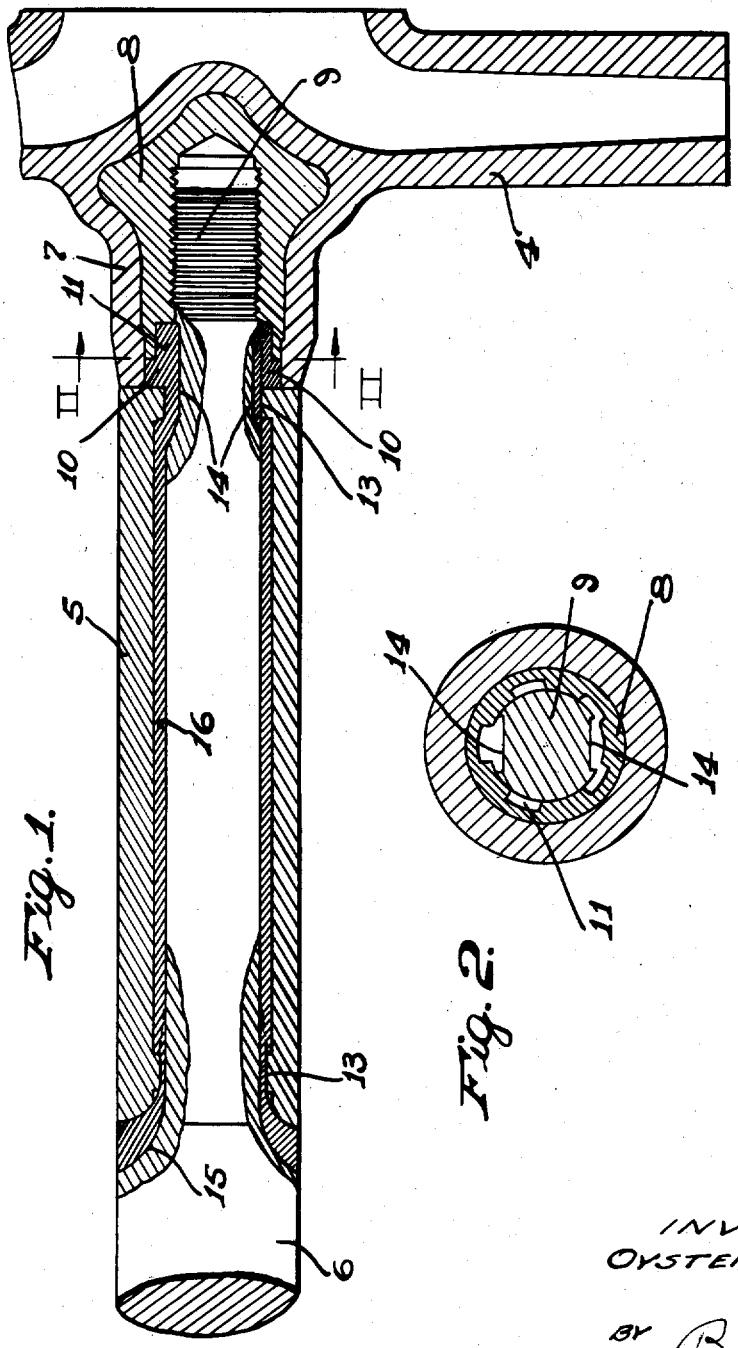
Fig. 1.
Fig. 2.
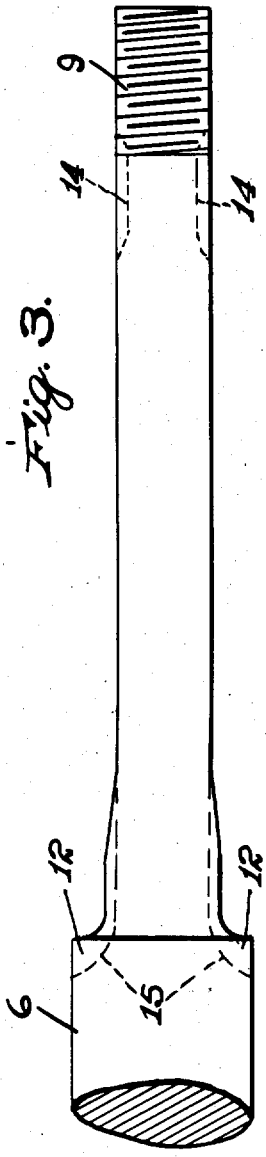
Fig. 3.
INVENTOR
OYSTEIN JACOBSEN
BY Bradley & Bee.
ATTORNEYS.

Reissued Aug. 27, 1940 Re. 21,541

UNITED STATES PATENT OFFICE 21,541

PUMP RUNNER ASSEMBLY

Oystein Jacobsen, Dayton, Ohio, assignor to The Duriron Company, Inc., a corporation of New York Original No. 2,143,484, dated January 10, 1939, Serial No. 201,994, April 14, 1938. Application for reissue April 6, 1939, Serial No. 266,433

13 Claims. (Cl. 287—53)

The invention relates to a pump runner assembly of the type requiring corrosion-resisting material as the composition of the runner proper and sleeve which contact with the liquid handled by the pump and a drive shaft of stronger, tougher material. The invention has for its object the provision of improved means for locking the runner to its shaft, so that in case the pump is started up backwards, the runner will not unscrew itself from the shaft.

Another object of the invention is to dissipate the heat contained in the sleeve which surrounds the drive shaft and bears against the stuffing box.

One embodiment of the invention is illustrated in the accompanying drawing, wherein:

Figure 1 is a longitudinal section through the assembly.

Figure 2 is a section on the line II—II of Figure 1, before applying the locking metal.

Figure 3 is a detail view of the shaft.

Referring to the drawing, 4 is the pump runner of corrosion resisting metal, such as high silica iron, which is not subject to machining other than grinding, and 5 is a sleeve or shroud of similar material surrounding and protecting the drive shaft 6 of machinable metal, such as steel or other metal commonly used in shafting. In the pump installation, the stuffing box of the pump casing fits around the sleeve in the customary manner, as shown for example in my Patent No. 2,049,204, dated July 28, 1936.

A cavity is provided in the hub 7 of the runner which carries a filler 8 of machinable metal, such as bronze, white metal or the like positioned by a casting operation. An opening is provided in the filler and threaded to receive the threaded end 9 of the drive shaft. An annular recess 10 is provided at the end of the filler, and a set of keyways 11 are milled in the end of the filler communicating at their outer ends with the recess 10. In the present instance, there are five keyways, as indicated in Figure 2, but this number may be varied, depending on the diameter of the shaft 6. A shoulder is provided on the shaft at 12, against which the lefthand end of the sleeve 5 engages, when the shaft is screwed into position, thus placing the sleeve in compression between the shoulder and the end of the hub 7 and preventing any rotary movement of the sleeve relative to the runner and shaft.

The sleeve fits around the shaft relatively closely at the end portions 13, 13 (Fig. 1), but intermediate such portions, a substantial clearance space is provided to permit of the pouring of the locking material later described. The part of the shaft opposite the annular recess 10 and keyways 11, is provided with a pair of keyways 14, 14, which keyways also extend past the portions 13, 13 of the sleeve. A pair of similar keyways 15, 15 are provided in the shaft 6 at the shoulder 12, which keyways extend past the portions 13, 13 of the sleeve which lie next to the shoulder.

The locking of the shaft against unscrewing is accomplished by flowing fusible metal 16, such as lead or Babbitt through the space between the sleeve and the shaft until the annular recess 10 and the keyways 11 leading therefrom are filled. It will be noted that regardless of the rotary position of the shaft with respect to the filler 8, the two keyways 14, 14 will always register with a plurality of keyways 11, thus insuring a filling of such grooves by the locking metal and an interlock against subsequent unscrewing of the shaft. It is apparent that inasmuch as the shaft cannot become unscrewed, the locking metal also serves to prevent any movement between the sleeve 5 and the runner 4.

In pouring the locking metal 16, the assembly is held with the shaft in vertical position and is heated to insure against freezing of the metal during the pouring operation. One of the keyways 15 adjacent the shoulder 12 is utilized as the inlet in pouring, a suitable funnel gate being applied to facilitate the operation. The metal, thus supplied, flows downward between the shaft and sleeve and fills the annular recess 10 and all of the keyways 11. The keyway 15 at the shoulder 12, which lies in opposition to the one through which pouring occurs, merely acts as an escape passage for air or gases during the pouring operation, thus facilitating the free inflow of the metal. When the assembly cools, the locking metal solidifies, and any unscrewing action of the runner relative to the shaft, is positively prevented, due to the locking effect of the metal in the two sets of keyways 11 and 14, the one lying in the filler and the other in the shaft. The arrangement also gives assurance that the keyways 11, which are overlapped by the keyway 14, will be filled with the fusible metal, since the combined depth of the two keyways permits a much more ready flow of the fused metal than is the case with those of the keyways 11 whose sole source of supply is the annular recess 10. These latter keyways constitute narrow pockets closed at their inner ends, and into which it is somewhat difficult to flow molten metal because of the air trapped therein.

As stated hereinbefore, as the shaft is screwed into the filler metal 8, the sleeve 5, positioned between the shoulder on the shaft and the hub 7 is subjected to the compressional stress along its axis. Consequently, any appreciable heat contained in this sleeve and produced, for example, by friction at the stuffing box, unless removed, may cause the sleeve to elongate and, therefore, bulge in the middle. It is also apparent that, in the absence of the metal layer 16, there would be an annular air space or chamber between the sleeve 5 and the shaft 6, which would preclude the transference of heat. In this connection, it must be understood that this annular space is initially provided in order that the entire inner surface of the sleeve need not be fitted as by grinding to the shaft—a laborious and expensive job. It is sufficient that the sleeve contact the shaft only at each end and the intermediate portion of the sleeve be simply roughcast to provide an annular space.

However, in accordance with the present invention, the metal layer 16, as well as the metal in the annular recess 10 and in the keyways 11, serve not only to provide a rigid lock between the shaft and the runner, but also to offer an easy path for the excess heat to flow from the sleeve 5 into the shaft which is at lower temperature. Thus, the temperature of the sleeve is kept below that at which it would bulge or in any other manner depart from its proper rectilinear shape, even though subjected to longitudinal stress.

It will be understood that I desire to comprehend within my invention such modifications as come within the scope of the claims and the invention.

Having thus fully described my invention, what I claim as new and desire to secure by Letters Patent is:

1. In combination in a pump runner assembly, a runner provided with a hub having therein a threaded socket with an annular recess at the outer end of the socket and a plurality of spaced keyways in the wall of the socket extending inward from said recess, a drive shaft having its inner end threaded and screwed into the socket and having a keyway adjacent its threaded end extending past the annular recess and along the keyways in the wall of the socket, a shoulder on the shaft remote from the end of the hub, a sleeve on the shaft clamped thereby between the shoulder and the end of the hub, a pouring passage being provided between the shaft and sleeve extending from the shoulder to the annular recess, and a fusible locking metal filling the passage, the annular recess and said keyways.

2. In combination in a pump runner assembly, a runner provided with a hub having therein a threaded socket with an annular recess at the outer end of the socket and a plurality of spaced keyways in the wall of the socket extending inward from said recess, a drive shaft having its inner end threaded and screwed into the socket and having a keyway adjacent its threaded end extending past the annular recess and along the keyways in the wall of the socket, a shoulder on the shaft remote from the end of the hub, a sleeve on the shaft clamped thereby between the shoulder and the end of the hub, and having its inner surface spaced away from the surface of the shaft except at the ends of the sleeve where the walls of the sleeve have a loose running fit on the shaft, the inner one of such points of running fit lying opposite the keyway in the shaft, a pouring keyway in the shaft at said shoulder extending past the outer one of the points of running fit, and a fusible locking metal filling the space between the sleeve and the shaft, the annular recess and said keyways.

3. In combination in a pump runner assembly, a runner provided with a hub having therein a threaded socket with an annular recess at the outer end of the socket and a plurality of spaced keyways in the wall of the socket extending inward from said recess, a drive shaft having its inner end threaded and screwed into the socket and having a keyway adjacent its threaded end extending past the annular recess and along the keyways in the wall of the socket, a shoulder on the shaft remote from the end of the hub, a sleeve on the shaft clamped thereby between the shoulder and the end of the hub, and having its inner surface spaced away from the surface of the shaft except at the ends of the sleeve where the walls of the sleeve have a loose running fit on the shaft, the inner one of such points of running fit lying opposite the keyway in the shaft, a pouring keyway in the shaft at said shoulder extending past the outer one of the points of running fit, a venting keyway in the shaft at said shoulder opposite to the pouring keyway also extending past the outer one of the points of running fit and a fusible locking metal filling the space between the sleeve and the shaft, the annular recess and the keyways.

4. In combination in a pump runner assembly, a runner provided with a hub having therein a threaded socket with an annular recess at the outer end of the socket and a plurality of spaced keyways in the wall of the socket extending inward from said recess, a drive shaft having its inner end threaded and screwed into the socket and having a keyway adjacent its threaded end extending past the annular recess and along the keyways in the wall of the socket, a shoulder on the shaft remote from the end of the hub, a sleeve on the shaft clamped thereby between the shoulder and the end of the hub, a pouring passage being provided between the shaft and sleeve extending from the shoulder to the annular recess, and a fusible locking metal filling the passage, the annular recess and said keyways, the spacing and width of said keyways being such that in all positions of rotation of the shaft with respect to the hub the groove in the shaft will overlap at least one of the keyways in the wall of the socket.

5. In combination in a pump runner assembly, a runner having a hub and a recess therein, a filler in the recess having a threaded socket with an annular recess at its outer end and a set of keyways extending inward from such recess in spaced relation, a drive shaft threaded into said socket and provided with a keyway at its threaded end which extends across the annular recess in parallel with said first keyways and registering with at least one of them, a shoulder on the shaft remote from the end of the runner hub, a sleeve surrounding the shaft and clamped between the shoulder and the end of the hub when the shaft is screwed into its socket in the filler, a pouring inlet for the annular recess and keyways extending from said shoulder longitudinally between the shaft and sleeve to said keyway in the shaft, and a locking body of fusible metal filling said inlet, the annular recess and the keyways.

6. In combination in a pump runner assembly, a runner having a hub and a recess therein, a filler in the recess having a threaded socket with an annular recess at its outer end and a set of keyways extending inward from such recess in spaced relation, a drive shaft threaded into said socket and provided with a keyway at its threaded end which extends across the annular recess in parallel with said first keyways and registering with at least one of them, a shoulder on the shaft remote from the end of the runner hub, a sleeve surrounding the shaft and clamped between the shoulder and the end of the hub when the shaft is screwed into its socket in the filler, the inner surface of the sleeve being spaced away from the shaft providing an annular space which communicates with said keyway in the shaft, a pouring inlet for said space at the outer end of the sleeve, and a locking body of fusible metal fitting said space and also the annular recess and keyways which are in communication therewith.

7. In combination, a pump runner assembly including a runner and a shaft, fusible means for securing the runner to the shaft, a sleeve separate from the runner but abutting therewith and surrounding the shaft leaving an annular space between the sleeve and the shaft, and means including a fusible metal filling said annular space for securing said sleeve to the shaft.

8. In combination, a pump runner assembly including a runner provided with a hollow hub adapted to receive the end of a drive shaft, a sleeve surrounding said shaft and bearing against the shaft at a plurality of positions leaving an annular space between said positions, and means consisting of heat-conducting material for securing the shaft to the sleeve, also to the hub and for filling said space.

9. In combination, a pump runner assembly including a runner provided with a hollow hub adapted to receive the end of a drive shaft, said shaft having a shoulder remote from the hub, a sleeve surrounding said shaft and positioned between the shoulder and the hub, said sleeve being spaced from the shaft except in a limited number of places where it touches the shaft, and means positioned in the space between the sleeve and the shaft for conducting heat from the sleeve to the shaft, said means consisting of heat-conducting material which also serves to secure the shaft to the hub.

10. In combination, a pump runner assembly including a runner provided with a hollow hub adapted to receive the end of a drive shaft, said shaft having a shoulder remote from the hub, a sleeve surrounding said shaft and positioned between the shoulder and the hub, said sleeve being spaced for practically its entire length from said shaft, and means consisting of heat-conducting material positioned in the space between the sleeve and the shaft for conducting heat from the sleeve to the shaft, said heat-conducting material also constituting means for securing the shaft to the hub.

11. In combination, a pump runner assembly including a runner and a shaft, a sleeve surrounding the shaft and bearing against the shaft in a limited number of positions leaving an annular space at the remaining positions, and means for draining excess heat from said sleeve and for securing said shaft to the runner and to the sleeve, said means consisting of a layer of metal contained within said space and between the shaft and the runner.

12. In combination, a pump runner assembly including a runner provided with a hub having a threaded opening, a drive shaft having its inner end threaded and screwed into said opening, said shaft having a shoulder remote from the hub, a sleeve surrounding the shaft and positioned between said shoulder and the hub whereby when the shaft is screwed into the hub, the sleeve is subjected to longitudinal stress by compression between said shoulder and said hub, said sleeve being fitted tightly about the shaft except for an annular space between the regions of contact, and means including metal contained in said space for preventing the sleeve from bulging due to said stress and accompanying heat whereby excessive heat is conducted from the sleeve through said metal to the shaft.

13. In combination, in a pump runner assembly, a runner provided with a hub having therein a threaded socket with an annular recess at the outer end of the socket and a plurality of spaced keyways in the wall of the socket extending inward from said recess, a drive shaft having its inner end threaded and screwed into the socket and having a keyway adjacent its threaded end extending past the annular recess and along the keyways in the wall of the socket, a shoulder on the shaft remote from the end of the hub, a sleeve on the shaft clamped thereby between the shoulder and the end of the hub, a pouring passage being provided between the shaft and sleeve extending from the shoulder to the annular recess, and a fusible heat-conducting material filling the passage, the annular recess and said keyways whereby the shaft is locked to the hub and excess heat is conducted away from the sleeve to said shaft.

OYSTEIN JACOBSEN.